Jan. 28, 1969   J. H. BORNZIN   3,424,471
COUNTER BALANCE MECHANISM FOR HARVESTERS
Filed Oct. 9, 1967
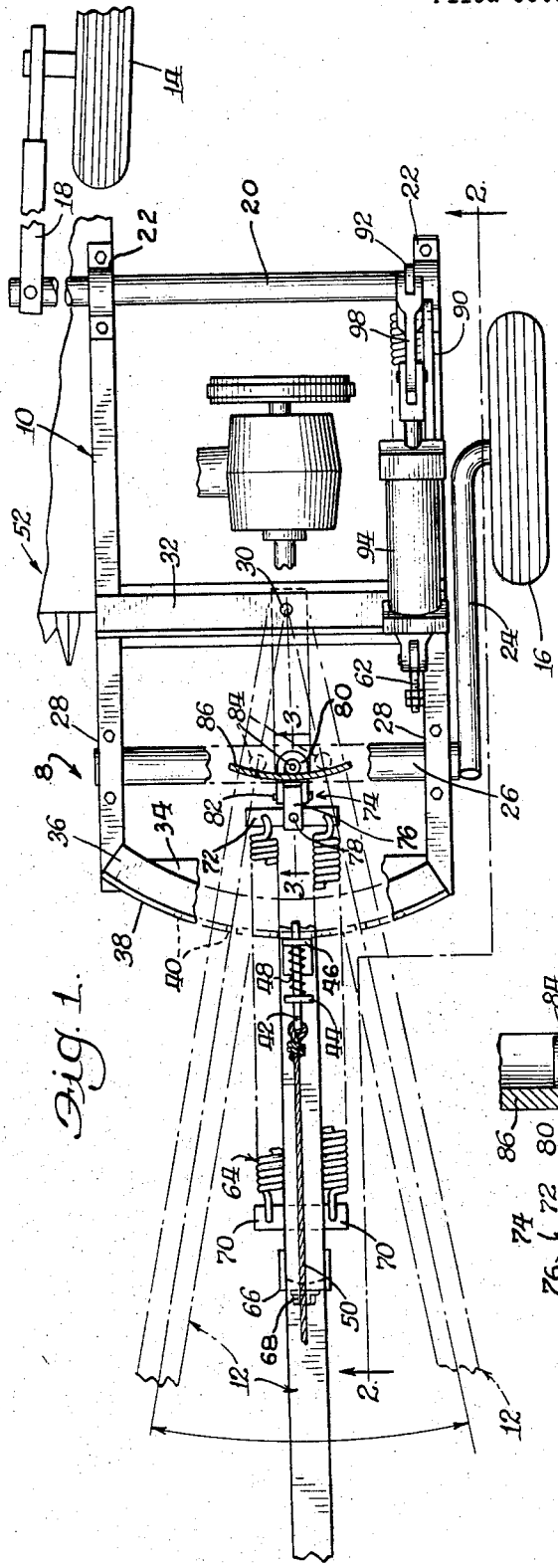
Inventor:
James H. Bornzin
John J. Kowalik
Atty.

United States Patent Office 3,424,471
Patented Jan. 28, 1969

3,424,471
COUNTERBALANCE MECHANISM FOR HARVESTERS
James H. Bornzin, La Grange, Ill., assignor to International Harvester Company, Chicago, Ill., a corporation of Delaware
Filed Oct. 9, 1967, Ser. No. 673,591
U.S. Cl. 280—43.18                14 Claims
Int. Cl. B62b 3/02

ABSTRACT OF THE DISCLOSURE

Forage harvester with wheel mounted frame, springs floatingly suspending the frame on the wheels, one spring connected between articulated parts of the frame, and including means for maintaining constant tension on the latter spring during turning.

Background

Forage harvesters of the type to which the present invention is particularly adaptable include a frame and a pair of wheels, the wheels being at the sides of the frame and generally offset fore and aft with respect to each other. Springs are utilized for suspending the frame from the wheels in a floating manner. Mounted on the frame is a harvesting component such as a cutter or sickle which is necessarily disposed close to the ground. When this sickle encounters an obstruction on the ground, it is thrown upwardly, and the springs serve to immediately overcome the static inertia of the frame and establish dynamic moment providing more effective floating condition of the frame carrying the harvesting component.

Summary of the invention

A broad object of the invention is to provide in a harvester of the foregoing general character a novel arrangement for maintaining effective counterbalance on the springs supporting the frame from the wheels.

A more specific object is to provide in apparatus of the character just referred to, and in a harvester having a frame with articulated parts, an arrangement of springs in which at least one spring is connected to different articulated parts, and constant tension is maintained on that spring in turning of the harvester.

In harvesters of this general character, it has always been a considerable problem to locate springs at the desired positions, which are of a size necessary for accomplishing the intended purpose. The construction and arrangement of the parts or elements making up the harvester are such that it has been difficult to locate the springs as mentioned.

A further object is to provide a harvester of the general character referred to in which at least one of the springs is connected to the main section of the frame, and the tongue, the tongue being of course articulated relative to the main section of the frame about a vertical axis, this providing a convenient location of the spring and providing a desired counterbalancing effect.

Another object therefore of the invention is to provide in a harvester of the character mentioned in which one of the springs is connected to the main section of the frame and to the tongue, and to provide means for maintaining constant tension on the spring in the turning movements of the harvester which are of course made by swinging the tongue.

A more specific object is to provide in a construction of the kind just referred to in which an arcuate element is provided, concentric about the axis of the swinging movement of the tongue relative to the main portion of the frame, and the spring mentioned is connected at one end to the tongue and at the other end to the arcuate element, so that in all lateral swinging movements of the tongue the tension on the spring remains constant.

Description of a preferred embodiment of the invention

FIGURE 1 is a plan view of certain components of a harvester made according to the present invention, and with certain detail parts of the construction omitted;

FIGURE 2 is a side view of the harvester of FIGURE 1, taken from the side of the observer, but showing additional components and also omitting certain details of construction; and FIGURE 3 is a detail sectional view taken on line 3—3 of FIGURE 1.

Referring now in detail to the accompanying drawings, a harvester of the invention shown in FIGURES 1 and 2 includes a frame 8 of suitable construction, including a rigid main section 10 and a tongue 12, and wheels 14 and 16. The wheel 14 is mounted on a wheel arm 18 extending generally forwardly and upwardly the other end of which is mounted on a torque member 20 supported in bearings 22 on the frame, and extending across the frame and a substantial distance therebeyond on one side.

The wheel 16 is mounted on a wheel arm 24 extending generally forwardly and upwardly where its other end is connected to a torque member 26 mounted in bearings 28 on the main frame section. Torque members 20 and 26 are substantially parallel. The wheels 14, 16 are spaced apart laterally, at the sides of the implement, and are displaced also in fore and aft direction. The manner in which the springs are connected for supporting the frame on the wheels will be described hereinbelow.

The tongue 12 is pivoted on the main frame section 10 at 30 on a cross-piece 32, and is supported by another fixed cross-piece 34 forwardly thereof, and confined between the element 34 and an upper arcuate element 36 fixed to the main frame section, and concentric about the axis 30. The fixed element 36 has an upstanding flange 38 in which are a plurality of apertures 40 for receiving a locking pin 42 for locking the tongue in a selected position. The pin 42 rides in apertures in lugs 44 and 46 mounted on the tongue and a compression spring 48 surrounds the pin and, reacting between the lug 44 and a fixed element on the pin, biases the pin in locking direction, i.e., for movement into one of the apertures 40. A pull cord 50 may be secured to the pin for convenience to the operator for withdrawing and unlocking the pin for enabling swinging of the tongue.

The harvester, which in the present instance may be a mower and crusher, is provided with a harvesting component or assembly indicated generally at 52 which in the present instance includes a sickle, and it extends substantially throughout the width of the implement, in a known manner. The sickle assembly may be of conventional kind and is mounted in fixed position on the main frame section and rises and lowers therewith. The sickle assembly includes elements such as guards 54 which directly engage the ground and upon encountering an obstruction there, the assembly tends to rise, and forces the frame section 10 upwardly, and the spring means to be described presently aids in raising the frame on such occasions.

Tension spring means 56, which may be a pair of separate springs are connected at one end with a downwardly extending lever arm 58 secured to the torque member 20. The springs extend forwardly and at their forward end are secured to a downwardly extending lug 60 which constitutes a fixed element of the main frame section. The spring means may include suitable and known attachments or adapters at their ends for mounting the springs, and suitable tension adjusting means 62 of desired type.

Second spring means 64, which in this case also may be made up of a pair of separate springs, is connected at one end to an element 66 fixed on the tongue. At this end suitable tension adjusting means 68 may be provided. The springs at their forward end are connected to the ends of a cross-piece 70 through which the tension adjusting means 68 operates, but which is maintained transverse to the tongue. The springs at their other ends are connected to the outer ends of another cross-piece 72 which is pivoted at its center in a universal connection 74 which includes a yoke or bracket 76 and a pin 78 forming the pivot means for the cross-piece 72. The connection 74 includes another yoke or bracket 80 and a pin 82 pivotally connected to the first yoke or bracket but on an axis transverse to the pin 78. At the extended end of the yoke or bracket 80 is a pair of rollers 84 riding on the concave surface of an arcuate element 86 secured to the torque member 26. This arcuate element 86 is a principal feature of the invention and will be described again hereinbelow. The connection at this point may include a transverse slot 88 formed in the arcuate element and through which the yoke or bracket 80 extends. The arcuate element 86 is concentric about the axis 30 of the tongue and upon swinging the tongue to either of its opposite side positions, the rollers 84 follow along the concave surface of the arcuate element and, as a consequence the spring means 64 is maintained at a constant tension in all positions of the tongue, in contrast to the relation without this arcuate element in which the spring means are connected between the articulated members, i.e., the tongue and the frame. Such a relationship holds whether the spring means 64 be a single spring, or a pair of springs, as shown. A single line of tension is established through a line which extends between the separate springs, i.e., through the axis 30, the rollers 84, the axis pin 78 and the tension adjusting means 68.

The arcuate element 86, extending downwardly from the torque member 26, forms a lever arm on the latter. Fixedly secured to the torque member 26 and extending upwardly therefrom is another lever arm 88 the upper end of which is pivotally connected with a push rod 90, the other end of the latter being pivotally connected to another lever arm 92 fixedly secured to the rear torque member 20. Suitable power means such as a hydraulic ram 94 is connected at one end to a fixed element 96 of the frame and the piston thereof connected with an arm 98 also pivotally connected to the arm 92 and preferably on the same axis of connection between the push rod and the arm 92. Interengageable surfaces 100 are formed on the arms 98 and 92, diverging from the axis 99 forming a lost motion connection between the lever arms 98, 92, but there is no lost motion between the push rod 90 and the lever arms 88 and 92.

The spring means 56, 64 bias the respective torque members 20, 26, in such direction (clockwise, FIGURE 2) as to bias the wheels downwardly and the frame upwardly, providing the floating suspension referred to above. Upon extension of the power device 94, and upon taking up of the lost motion provided at 100, the lever arm 92 is rotated clockwise, rotating the torque member 20 and this lever arm acting through the push rod 90 and lever arm 88 rotates the torque member 26; these two torque members are rotated a substantial amount, pushing the wheels to the ground and elevating the frame to carry the sickle assembly out of operative position.

The spring means 56, 64 serve to support the different portions of the frame at the desired level, in a floating condition, the spring means being located according to the effect desired and according to the location thereof. As noted above finding a location that the springs can be positioned has always been a serious difficulty. For example, they must be of such size as to provide the desired suspending power, but they cannot be located where they would entangle with the crop plants being worked upon. Positioning the spring means 64 at the location here disclosed, provides a great advantage in that it can be made of substantial size and strength and still be placed in a relatively out-of-the-way position. Since the spring means 64 must of course work on one of the torque members it is consequently connected with the frame or an element mounted thereon. Since its other end is connected with the tongue, and the tongue can swing laterally about a vertical pivot, the tension of the spring means would vary greatly in the absence of the arrangement here provided. The arcuate element 86 and the relation between that element and the spring mounting provides constant length and tension of the spring means in all positions of lateral movement, as in turning.

I claim:

1. A harvester of the character disclosed comprising a frame, wheels, spring means operative to urge the wheels downwardly, thereby suspending the frame on the wheels in a floating manner, the frame having parts articulated about a predetermined axis, said spring means including a spring connected to one of the articulated parts, and means connected to the spring and mounted on the other part for constant spring loading independent of relative angular movement of the articulated parts during articulation of the parts, said means connected to the spring serving to transmit the spring force to at least one of said wheels.

2. The invention set out in claim 1 wherein said connecting means include an arcuate member mounted on said other part of the frame parts concentric with the axis of connection between the parts, and said spring has connection with said other frame part through engagement with the concave side of the arcuate member.

3. The invention set out in claim 2 wherein the frame includes a main section and a tongue, the point of connection therebetween is at a relatively rearward position, and the arcuate member is disposed forwardly of that point of connection.

4. The invention set out in claim 2 wherein the wheels are mounted on torque members, the spring means act through the torque members, and said arcuate member is mounted on one of the torque members, through said arcuate member in acting through the corresponding torque member.

5. A harvester of the character disclosed comprising a frame including a main frame section and a tongue pivoted thereon on a vertical axis, a first wheel at one side of the frame, a first torque member mounting the wheel and itself mounted on the main frame section and extending transversely thereof, a first spring operatively connected between the first torque member and the main frame section biasing the wheel downwardly and the torque member upwardly, a second wheel, a second torque member mounting the second wheel and itself mounted on the main frame section at a position forwardly of said pivot axis, a second spring operatively connected between the second torque member and the tongue biasing the second wheel downwardly and the second torque member upwardly, and means for maintaining the second spring on a line between its point of connection on the tongue and said pivot axis in all positions of the tongue in its movement about said pivot axis.

6. The invention set out in claim 5 wherein the last means includes an arcuate member concentric with said pivot axis, rollers are provided on the second spring and operatively engage the concave surface of the arcuate member.

7. The invention set out in claim 6 wherein the arcuate member is provided with a transverse slot, an adapter is provided on the spring and extends through the slot, and the rollers are mounted on the extended end of the adapter.

8. The invention set out in claim 7 wherein the second spring includes a pair of transversely spaced spring elements, and the means connecting the spring to the arcuate member includes a universal joint which incorporates a center-pivoted bar to the ends of which the spring elements are secured.

9. The invention set out in claim 6 wherein said arcuate member constitutes a lever arm on the second torque member and the second spring acts therethrough in acting on the second torque member.

10. The invention set out in claim 9 wherein the arcuate member extends downwardly and the second spring is disposed under the tongue and extends under the main frame section.

11. The invention set out in claim 5 wherein the means connecting the tongue to the main frame section includes a transverse element forming a first rigid element of the main frame section, and the main frame section includes a pair of vertically spaced transverse rigid elements forwardly of the first rigid element confining the tongue therebetween against vertical displacement.

12. The invention set out in claim 11 wherein the upper one of the vertically spaced rigid elements is arcuate throughout the range of movement of the tongue and concentric about said pivot axis, and means is mounted on the tongue for releasably engaging said arcuate rigid element and locking the tongue in selected positions in its range of movement.

13. A harvester of the character disclosed comprising a frame including a main frame section and a tongue pivoted thereto on a vertical axis, a first wheel at one side of the frame and adjacent the rear, a first torque member mounting the first wheel and itself mounted on the main frame section adjacent the rear and extending transversely thereacross, the first torque member having a downwardly extending lever arm, a first spring connected to said lever arm and extending forwardly and connected with a fixed element of the main frame section, a second wheel at the other side of the frame and forwardly of the first wheel, a second torque member mounting the second wheel and itself mounted on the main frame section forwardly of the first torque member and extending transversely across the main frame section, the second torque member having a downwardly extending second lever arm, a second spring connected with the second lever arm and extending forwardly and connected with the tongue, means maintaining the tension constant on the second spring in all positions of the tongue about said pivot axis, the torque members also having upwardly extending lever arms, and power means mounted on the main frame section and acting through the upwardly extending lever arms operative for vertically moving the frame into and out of operative position.

14. The invention set out in claim 13 and including a push rod interconnecting the upwardly extending lever arms, and the power means operates through one of those lever arms.

References Cited

UNITED STATES PATENTS

| | | | |
|---|---|---|---|
| 2,771,830 | 11/1956 | Schill | 280—43.23 |
| 3,056,610 | 10/1962 | Massey | 280—43.18 |

LEO FRIAGLIA, *Primary Examiner.*

R. R. SONG, *Assistant Examiner.*